United States Patent Office.

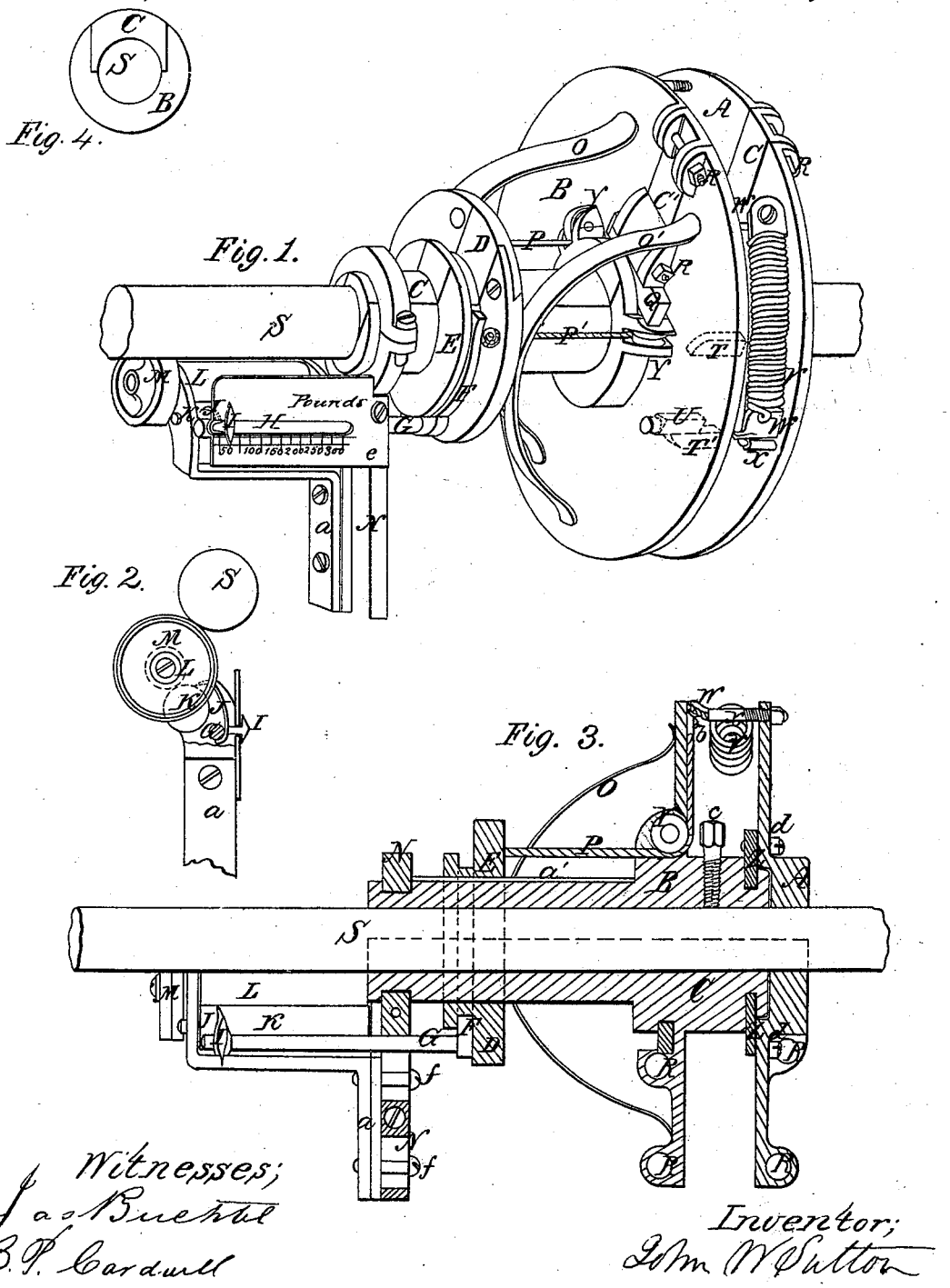

JOHN W. SUTTON, OF PORTLAND, OREGON.

Letters Patent No. 98,205, dated December 21, 1869.

---

IMPROVEMENT IN DYNAMOMETERS.

---

The Schedule referred to in these Letters Patent and making part of the same.

---

*To all whom it may concern:*

Be it known that I, JOHN W. SUTTON, of Portland, in the county of Multnomah, State of Oregon, have invented a new and improved Rotation Dynamometer, for the purpose of measuring the power used in running machinery, and making a diagram of the power used at the time; and I do declare that the following is a full and exact description thereof, reference being had to the accompanying drawings, and to the letters of reference marked thereon, making a part of this specification.

The nature of my invention consists in making a rotation dynamometer that can be put upon a shaft, without taking it from its bearings, or moving anything upon it, or disturbing the working-parts of the instrument.

To enable others skilled in the art to make and use my invention, I will proceed to describe its construction and operation.

Figure 1 is a perspective view.

Figure 2 is an end view of the rollers, &c., that make the diagram.

Figure 3 is a sectional view.

Figure 4 is an end view of the hub, showing the opening around the shaft.

I construct my dynamometer of iron, or any suitable metal.

Disk A is made with short hub on the outside. The inside of the disk is recessed, to let the end of hub of disk B into it, that the collar Z (with a section cut out of it) may be slipped into the groove in the hub of B, and fastened to disk A by the screws *d d d*, to prevent the two disks from separating, but allowing A to turn freely on B.

A section is cut out of A, (shaded blue,) a little wider than the shaft, down to the centre of the disk. The section cut out is filled by the piece C, and bolted in through the lugs, by bolts R R.

Stops T T are put into A, and stop U into disk B, to prevent too great a strain upon the springs.

Posts W W, disk A, are to attach one end of springs V V.

In the end of the posts, next B, are slots. Through them pass cords P P P, the end of each having a screw, X, that goes through a hole in A, and has an adjusting-nut on the outside.

Two or more rows of spiral springs may be put in.

The disk B is made with a hub on each side of it. On the inside, the hub goes into the recess in A; on the outside, the hub is turned off for the grooved sliding collar E to slide upon, and a groove made near the end, for the yoke N to hang in.

A section is cut out of B (shaded blue) down to the centre of the disk, shaped as in fig. 4. The piece C', that fills the opening, is held in firmly by key Q and bolts R R.

To posts W W are fastened the other ends of springs V V. (All the posts and springs are not shown in the drawings.) Cords P P P pass from posts W W, in A, over the small sheaves *b b*, on B, down through holes in B, around sheaves Y Y, and the ends are fastened to grooved collar E.

A set-screw, *c*, fastens B when in place, to the shaft.

In the outer hub of B, on one side, is a feather, *a'*, that fits in a slot in E, to prevent E from turning on the hub.

E has a section cut out of it, and is filled with a piece, D, (shaded blue,) held in by screws.

Light curved springs, O O, are fastened to E, at their centres, their ends resting and sliding on the face of B, their use being to hold cords P P P taut, and E out to the full length of the cords.

The half yoke F lays in the groove of E, and is attached to the index-rod G, that passes through the hanging yoke N, and carries the pointer I and pencil-point J.

The hanging yoke N is in the groove at the end of the hub, the heavy end hanging below the shaft when it revolves.

Index *e* is attached to N, with the scale in pounds of pressure.

A frame, *a*, slides up and down on N, and is held by screws *f f*.

In slots, in N, the frame has two rollers, L K.

On the outside of the frame is a friction-wheel, M, on the roller L, that touches the shaft S when the frame is raised.

The pencil-point J touches the roller K, when M is in contact with the shaft.

To put the dynamometer in operation, take out the screws in the hanging yoke N, remove N and its attachments; take out the screws in E, and remove D; take out bolts R R, in A, and remove C; take out key Z and bolts R R, and remove C'.

Put the dynamometer on the shaft with A next the pulley or wheel to be tested; put C, C', D, and N back in the order they were taken out. Attach the pulley or wheel to A by the most convenient way under the circumstances.

Take out the key or set-screw of the pulley or wheel, so that it may turn freely on the shaft; screw up the set-screw *c*, so that the dynamometer will be fast to the shaft.

The shaft revolves, carrying B with it. The pulley, with A, resists, by the work taken off it, and stands until the springs expand so that their tension equals the work on the pulley, when all revolve together.

The springs expanding, lengthen the distance between W in A and the sheave *b* on B, drawing the cords P P P over *b* and Y, and by them the grooved sliding collar E, with the half yoke F and index-rod G, bending the curved springs O O, the pointer I showing on the scale the pounds of pressure transmitted through the dynamometer.

As the work is lessened on the pulley, the springs contract, drawing A and the pulley faster, and shortening the distance between W and $b$.

The curved springs O O force E out, keeping P P P always taut, so that I always shows on the index the amount of foot-pounds of work done each revolution.

To get a diagram, cut a strip of paper the width of the inside of the frame, rule it as the divisions of foot-pounds are on the index, place one end between the rollers L K, place one finger under the frame $a$, and raise it until M is in contact with the shaft.

The friction-wheel M revolves the roller L, carrying the paper; the pencil-point J moving at right angles with the paper on the index-rod G, marks the diagram of the work done, and the variations as they occur during the time of taking.

What I claim, and wish to secure by Letters Patent, is—

1. The long end of the hub of B, with feather $a'$, the sliding grooved collar E, the curved springs O O, the cords P P P, sheaves Y Y Y $b\ b\ b$, and screws X X X, on the ends of P P P, with their adjusting-nuts, substantially as set forth.

2. The half yoke F, index-rod G, hanging yoke N, scale $e$, in combination with the sliding collar F, and long end of hub of B, substantially as set forth.

3. The frame $a$, rollers L K, friction-wheel M, and pencil-point J, in combination with index-rod G, half yoke F, and sliding grooved collar E, substantially as set forth.

JOHN W. SUTTON.

Witnesses:
   JAS. BUCHTEL,
   B. P. CARDWELL.